US012541863B2

(12) United States Patent
Zhenirovskyy et al.

(10) Patent No.: US 12,541,863 B2
(45) Date of Patent: Feb. 3, 2026

(54) MICRO-OBJECT MOVEMENT MONITOR TO OBSERVE CONTROLLED MICRO-OBJECT MOVEMENT

(71) Applicant: Xerox Corporation, Norwalk, CT (US)

(72) Inventors: Maksym Zhenirovskyy, San Jose, CA (US); Ion Matei, Mountain View, CA (US)

(73) Assignee: GENESEE VALLEY INNOVATIONS, LLC, Santa Clara, CA (US)

( * ) Notice: Subject to any disclaimer, the term of this patent is extended or adjusted under 35 U.S.C. 154(b) by 272 days.

(21) Appl. No.: 18/503,698

(22) Filed: Nov. 7, 2023

(65) Prior Publication Data

US 2025/0148621 A1  May 8, 2025

(51) Int. Cl.
*G06T 7/246* (2017.01)
*G06T 7/73* (2017.01)

(52) U.S. Cl.
CPC ............... *G06T 7/248* (2017.01); *G06T 7/74* (2017.01); *G06T 2207/10016* (2013.01); *G06T 2207/20081* (2013.01); *G06T 2207/30108* (2013.01)

(58) Field of Classification Search
CPC . G06T 7/248; G06T 7/74; G06T 2207/10016; G06T 2207/20081; G06T 2207/30108
See application file for complete search history.

(56) References Cited

U.S. PATENT DOCUMENTS

| 7,705,996 B2 * | 4/2010 | Kim | G01B 9/0209 |
| | | | 356/508 |
| 9,996,920 B2 * | 6/2018 | Du | G06T 5/50 |
| 11,148,941 B2 | 10/2021 | Plochowietz et al. | |

(Continued)

FOREIGN PATENT DOCUMENTS

EP  3296824 A1 *  3/2018  ............ G06T 7/194

OTHER PUBLICATIONS

Matei, et al., "Towards printing as an electronics manufacturing method: micro-scale chiplet position control", 2017 American Control Conference, May 24-26, 2017, Seattle USA, pp. 1549-1555.

(Continued)

*Primary Examiner* — Pinalben Patel
(74) *Attorney, Agent, or Firm* — Fleit Intellectual Property Law; Jeffrey N. Giunta

(57) ABSTRACT

What is disclosed is methods and systems for monitoring micro-object movements. Images depicting micro-objects moving across a backplane is received. Based on processing by a machine learning based image processing model, a first location and orientation of each micro-object in a first image and a second location and orientation of each micro-object in a second image is determined. Based on estimates of forces applied during a time between capture of the first and second images, movement during the time of a micro-object in the first image is estimated. A likely image of the micro-object in the second image is inferred based on the likely image having a location and orientation in the second image that corresponds to a combination of the movement and the location and orientation of the micro-object in the first image. An indication that the micro-object in the first image corresponds to the likely image is output.

22 Claims, 8 Drawing Sheets

(56) References Cited

U.S. PATENT DOCUMENTS

| | | |
|---|---|---|
| 11,203,525 B2 | 12/2021 | Plochowietz et al. |
| 11,242,244 B2 | 2/2022 | Plochowietz et al. |
| 2009/0218260 A1* | 9/2009 | Chow .................. B81C 99/002 700/227 |

OTHER PUBLICATIONS

I. Matei, J. d. Kleer, C. Somarakis, A. Plochowietz and J. S. Baras, "Micro-scale 2D chiplet position control: a formal approach to policy design," 2020 59th IEEE Conference on Decision and Control (CDC), Jeju, Korea (South), 2020, pp. 5519-5524, doi: 10.1109/CDC42340.2020.9303808.

I. Matei, A. Plochowietz, J. de Kleer and J. S. Baras, "Micro-scale chiplet assembly control with chiplet-to-chiplet potential interaction," 2021 60th IEEE Conference on Decision and Control (CDC), Austin, TX, USA, 2021, pp. 623-628, doi: 10.1109/CDC45484.2021.9683066.

I. Matei, S. Nelaturi, E. M. Chow, J. P. Lu, J. A. Bert and L. S. Crawford, "Micro-Scale Chiplets Position Control," in Journal of Microelectromechanical Systems, vol. 28, No. 4, pp. 643-655, Aug. 2019, doi: 10.1109/JMEMS.2019.2914045.

Joseph Redmon, Santosh Divvala, Ross Girshick, Ali Farhadi; Proceedings of the IEEE Conference on Computer Vision and Pattern Recognition (CVPR), 2016, pp. 779-788.

* cited by examiner

MICRO-OBJECT MOVEMENT MONITOR TO OBSERVE CONTROLLED MICRO-OBJECT MOVEMENT

TECHNICAL FIELD

The present invention is directed to automated image processing, and more particularly, to systems and methods for monitoring controlled movements of objects.

BACKGROUND

Electrostatic micro-assembler technology utilizing a dynamic electrostatic electrode actuator array is a technique used to arrange micro-objects, such as microchips of various types, into a defined arrangement on a backplane according to a design of an apparatus being assembled. Such electrode actuator arrays include a number of electrodes that are selectively activated to produce an arrangement of time varying electrostatic fields across the electrode array that are able to cause micro-objects to move using electrophoretic or dielectrophoretic force induced by the electrostatic fields generated across the dynamic electrostatic electrode actuator array. The present locations of these micro-objects during such operations are determined and monitored in some examples by automated analysis of images captured by a camera capturing a time sequence of images of the backplane as the micro-objects are moved by the generated electrostatic fields.

Based on the determined present location of each micro-object and the location into which the micro-objects are to be finally placed, processing determines an electric force profile to be generated across the dynamic electrostatic electrode actuator array for a time period that will move the micro-objects in the direction of a subsequent location that is closer to the intended final location of each micro-object. Efficient operations of such systems sometimes utilize various image processing techniques to quickly and efficiently process each image in the time sequence of captured images of the backplane to produce data indicating the present location of each micro-objects on the backplane.

BRIEF SUMMARY

What is disclosed is an apparatus for monitoring movement of micro-objects on a backplane. The apparatus includes an image receiver configured to, when operating, receive a time sequence of captured images of a micro-assembler backplane being processed within a micro-assembler station. The time sequence of images depicts a progression of a plurality of micro-objects moving across the micro-assembler backplane under control of the micro-assembler station. The apparatus also includes an image processor configured to, when operating: 1) determine, based on processing of a first captured image in the time sequence of captured images by a machine learning based image processing model, a respective first location and a respective first orientation of each respective micro-object in the plurality of micro-objects on the micro-assembler backplane captured in the first captured image; and 2) determine, for the second captured image in the time sequence of images, a respective second location and respective second orientation of each respective micro-object on the micro-assembler backplane. The apparatus further includes a movement processor configured to, when operating: 1) estimate, based on estimates of forces applied during a time duration between a time of capture of the first captured image and a time of capture of a second captured image in the time sequence of captured images, a calculated movement during the time duration for a tracked micro-object captured with a first location in the first captured image in the time sequence of images; and 2) infer a likely image of the tracked micro-object in the second captured image based on the likely image having a respective second location and a respective second orientation in the second captured image that corresponds to a combination of the calculated movement for the first micro-object applied to the respective first location and the respective first orientation of the first micro-object in the first captured image. The apparatus further includes an indicator output configured to, when operating, indicate, based on an inference of the likely image of the tracked micro-object in the second captured image, that the tracked micro-object in the first captured image corresponds to the likely image of the tracked micro-object in the second captured image.

What is further disclosed is a method of controlling placement of micro-objects on a backplane. The method includes receiving a time sequence of captured images of a micro-assembler backplane being processed within a micro-assembler station. The time sequence of images depicts a progression of a plurality of micro-objects moving across the micro-assembler backplane under control of the micro-assembler station. The method also includes determining, based on processing of a first captured image in the time sequence of captured images by a machine learning based image processing model, a respective first location and a respective first orientation of each respective micro-object in the plurality of micro-objects on the micro-assembler backplane captured in the first captured image. The method further includes estimating, based on estimates of forces applied during a time duration between a time of capture of the first captured image and a time of capture of a second captured image in the time sequence of captured images, a calculated movement during the time duration for a tracked micro-object captured with a first location in the first captured image in the time sequence of images. The method also includes determining, for the second captured image in the time sequence of images, a respective second location and respective second orientation of each respective micro-object on the micro-assembler backplane. The method further includes inferring a likely image of the tracked micro-object in the second captured image based on the likely image having a respective second location and a respective second orientation in the second captured image that corresponds to a combination of the calculated movement for the first micro-object applied to the respective first location and the respective first orientation of the first micro-object in the first captured image. The method also includes indicating, based on identifying the likely image of the tracked micro-object in the second captured image, that the tracked micro-object in the first captured image corresponds to the likely image of the tracked micro-object in the second captured image.

Features and advantages of the above-described apparatus and direct-to-object print system will become readily apparent from the following description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Non-Limiting Definitions

Figure 1:
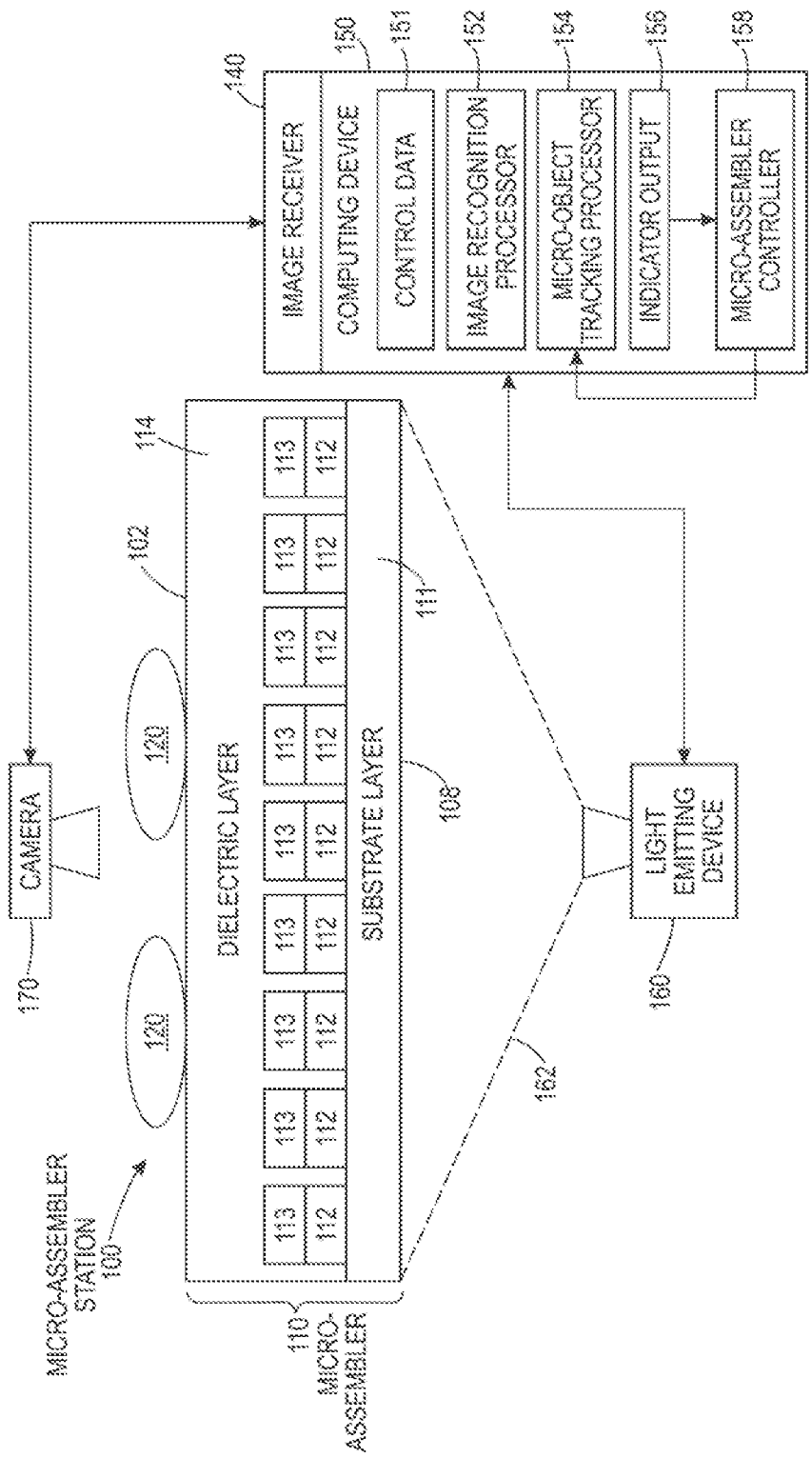
FIG. 1 illustrates a micro-assembler station, in accordance with an example.

A "Micro-object" broadly refers to a small object or particle that may be used for various purposes in the manufacture and construction of various devices. Some assembly processes place a number of micro-objects into particular locations on a micro-assembler backplane.

A "Backplane" in the context of the following discussion broadly refers to a substrate onto which micro-objects are able to be placed and manipulated into selected locations.

A "Micro-assembler" broadly refers to a manufacturing apparatus that operates to place one or more micro-objects into selected locations on a surface, such as a micro-assembler backplane.

A "Micro-assembler backplane" broadly refers to a backplane that is also equipped with elements that operate with a micro-assembler to manipulate micro-objects placed thereon.

An "Electrode" in this context broadly refers to an element adapted to create an electric force when a voltage is applied thereto.

"Electric force" broadly refers to any electro, magnetic, electro-magnetic, or other force, including DEP, EP, other types of forces, or combinations of these, applied to a surface to manipulate the placement, such as location, orientation, other physical characteristics, or combinations of these, of micro-objects.

"Placement of a micro-object" broadly refers to part or all of the physical disposition of a micro-object, including, without limitation, one or more of location, orientation, other aspects, or combination thereof.

"A frame of reference" broadly refers to any type of location and orientation reference defined by any suitable alignment system that can be defined by, for example and without limitation, the borders or other elements of an image, a frame of reference defined by one or more physical objects, other frames of references, or combinations of these.

"Location of a micro-object" broadly refers to the physical location of a micro-object relative to any frame of reference.

"Orientation of a micro-object" broadly refers to the physical alignment of a micro-object in any one or more axes relative to any frame of reference.

An "Image" broadly refers to any collection of data that represents a physical arrangement of objects. Images are able to be, without limitation, physical presentations such as printed material, defined in electronic data files according to any suitable format, defined in other ways, or combination of these.

A "View" of an object in an image broadly refers to the depiction that is present in an image of a particular object. Views often have a viewing an angle at which that object is depicted in that image and also depict the object at an orientation relative to some frame of reference.

A "Captured image" broadly refers to any image that has been captured by any technique, such as, without limitation, with a camera of a scene including one or more objects of interest.

A "Synthesized image" broadly refers to any image that is generated by any means other than a complete single image as is captured by an image capturing device. A synthesized image in general has two or more elements that each originate from different sources, such as, without limitation, from different captured images, from human artists, from automated image generation processes, from any other source, or combinations of these. A synthesized image is also able to be generated by rearranging parts of a single image into a different overall image than the originally captured image. Synthesized images are able to be generated as a combination of elements by any suitable technique, such as by computer-based image processing to combine elements, by human artists, by other means, or any combination of these.

A "Machine learning based process" broadly refers to any automated processing structure that is defined or redefined at least in part by processing data in order to arrange its processing to produce desired outcomes. A machine learning based process generally has two phases of existence, a training phase where it defines or redefines its processing structure by processing data, and an operational phase where the processing structure defined or redefined in the training phase processes data to infer outcomes based on processing that data.

A "Machine learning based image processing model" broadly refers to a part of a machine learning based process that includes a processing structure that is defined or redefined by the training phase of the machine learning based process. In some examples, the machine learning based image processing model is able to be deployed to other processors for the operational phase of the machine learning based process.

An "Object image" broadly refers to an image that contains an object whose presence in an image is to be inferred by a machine leering based image processing model.

A "Machine learning process training data set" broadly refers to any data that is able to be used to support the learning phase of a machine learning based process.

A "Time sequence of images" broadly refers to any set of images where the images are captured over a period of time. The images in a time sequence of images in some examples, without limitation, may capture images of a similar view or of different views of the same or different objects to capture changes over time.

A "Time sequence of images" broadly refers to any time sequence of images that has been captured by any technique, such as, without limitation, with a camera of a scene including a micro-assembler backplane with micro-objects.

A "Progression of a plurality of micro-objects" broadly refers to a time progression of a movement of micro-objects over a period of time. In an example, a progression of a plurality of micro-objects refers to, without limitation, movement of micro-objects across a surface of a micro-assembler backplane as those micro-objects are moved under the control of a micro-assembler station.

"Determining a location and orientation of a micro-object" broadly refers in one example to processing of an image captured of the surface of a micro-assembler backplane to identify one or more micro-objects that are present in that image of that surface and to also infer the placement of that micro-object relative to a frame of reference. The inferred placement in some examples includes but not limited to at least one of the location of each identified micro-object in that image, the orientation of each micro-object in that image, other attributes, or combinations of these.

"Inferring a likely image of a tracked micro-object" broadly refers to processing an image to identify a likely portion of that image that is a particular micro-object. In an example, without limitation, such processing is performed by a machine learning based image processing model that has been trained to infer the placement of micro-objects in captured images.

"Indicating that a tracked micro-object in a first image corresponds to a likely image of the tracked micro-object in the second image" broadly refers to providing any indication that a micro-object with a placement inferred in a captured image is the same micro-object that is captured in a subsequent image with a different inferred placement.

"Estimating a calculated movement" broadly refers to calculating movements of an object, such as but not limited to micro-objects, during a duration of time based on known forces exerted on that object. In an example, estimating a calculated movement includes, but is not limited to, estimating velocities of micro-objects based on estimates of electric forces exerted on a micro-object placed on a micro-assembler backplane. The electric forces are able to be estimated, for example, based on known activation of electrodes on the surface of that micro-assembler backplane under the control of a computing device during that duration of time.

A "Label" in this context broadly refers to information describing an object such as an image or part of an image. In an example, without limitation, a label identifies the object and details characteristics of that object such as location and orientation in an image.

A "Set of label data" broadly refers to any collection of label data that is associated with two or more objects. In an example, without limitation, a separate set of label data is able to be associated with each object associated with a set of label data A "Training image" broadly refers to any image that is used to train a machine learning based image processing model. Training images in some examples may, but are not required to, be associated with data such as label data indicating a ground truth describing the training image.

A "Training image corresponding to a micro-assembler backplane" broadly refers to an image of a micro-assembler backplane that is suitable for training a machine learning based image processing model to recognize images present on a micro-assembler backplane. In some examples, without limitation, a training image corresponding to a micro-assembler backplane also includes images of micro-objects located at various locations with various positions on the micro-assembler backplane. In some examples, a training image corresponding to a micro-assembler backplane also has an associated composite set of label data that specifies the location and orientation of each micro-object contained in the training image.

An "Image corresponding to a surface of a micro-assembler backplane" broadly refers to any image of a surface of a micro-assembler. In various examples, without limitation, such an image may include objects, such as micro-objects, that are also present on the surface or the surface is able to have no other objects thereon. In various examples, the image corresponding to a surface of a micro-assembler backplane is able to include images of electrodes that are visible on that surface. In various example, an image corresponding to a surface of a micro-assembler backplane is able to be an image of such a surface captured by an image capture device, such as a camera, or it is able to be a synthesized image generated by an artist, at least in part by automated computer-generated images, other techniques, or combinations of these.

"Rotating a view" broadly refers to any manipulation of an image that causes the image to rotate its orientation relative to a frame of reference. In some examples, without limitation, an image of an object, such as a micro-object, is able to be copied and processed to rotating its view to cause that image to contain an image of a micro-object with a different orientation.

An "offset angle" in this context broadly refers, in the case of an offset angle of a micro-object captured within an image, to an angle of the object with respect to a frame of reference of that image. The offset angle broadly refers to the angle of the micro-object in any of one, two, or three dimensions.

"Activation" of an electrode" includes, without limitation, applying a voltage to an electrode to cause an electric force to be generated by the electrode.

"Manipulating micro-objects" broadly refers to any movement or other changes of micro-objects that is caused by any mechanism, including, without limitation, applying electric force on a surface of a micro-assembler backplane to move or change one or both of that micro-object's location or orientation.

A "Controller" is a device that is able to perform functions to control equipment based on one or more of programming, received inputs, prior control actions, other factors, or combinations of these.

"Receiving an image from a camera" or "receiving an image of the surface of the micro-assembler backplane" includes receiving, from any sensor device, data representing sensed physical locations of micro-objects within a range of that sensor device. In general, images that contain images of micro-objects on a first surface includes any dataset that includes information indicating locations of micro-objects on the surface of a backplane, regardless of methods and technologies used to present or obtain that image or location data.

An "Image receiver" broadly refers to any structure, apparatus, or thing that is configured to receive one or more images via any suitable technique.

An "Image Processor" broadly refers to any processor that is able to process one or more images, including time sequences of images, according to any one or more processing techniques.

A "Movement processor" broadly refers to any processing that processes data of any type to determine one or more of past movements or future movements of objects or micro-objects based on the received data.

An "Indicator output" broadly refers to any output structure that is able to provide an output to any suitable structure such as, without limitation, the same or another process or device.

A "Training data set generator" broadly refers to any process, structure, or other configuration that generates a data set suitable for training a machine learning process. Various types of training data set generators are able to generate one or more training data set with one or more of no data to be used as a basis for the training data set, no data that is to be included in the training data set, some data that is to be included in the training data set, some data that is to be used as a basis for the training data set, or with combinations of these.

A "Machine learning model training processor" broadly refers to any processor, apparatus, structure, or other configuration that is used to support training of any type of machine learning model.

The below described systems and methods are directed to operations of systems that arrange micro-objects into determined locations. Examples of such systems are micro-assemblers. Micro-assemblers in some examples are a type of manufacturing equipment that operates to assemble products containing micro-objects by manipulating one or more micro-objects that are on a surface in order to cause those micro-objects to be placed into defined locations on that surface. Micro-objects in some examples are small objects or particles that may be used for various purposes in the manufacture and construction of various devices. In some examples, a micro-object may be an object that ranges in size from less than one (1) micrometer to more than five-hundred (500) micrometers, although other sizes are possible.

The operations of such micro-assemblers sometimes involve monitoring the location of micro-objects as they move across the surface to determine their present location by capturing a time sequence of images of that surface as the micro-objects are moved. These images are processed to determine where the micro-objects are on the surface and their orientations in order to facilitate determining an electric force profile to generate across the surface for a next time interval to advance the micro-objects towards the determined locations into which they are to be located.

In general, micro-assemblers operate to simultaneously manipulate the position and orientation of a large number of micro-objects on the surface. The processing of such a time sequence of images that capture the surface with such a large number of moving micro-objects, where the micro-objects are able to be at any location and have any orientation in a particular captured image, imposes challenges in creating machine learning based image processing models to efficiently process such images to identify micro-objects to support tracking of those micro-objects over time as captured by a time sequence of images.

The below described systems and methods set forth efficient processing to identify and track the movement of micro-objects across a surface where that movement is propelled at least in part by controlled electric forces generated across the surface. The below systems and methods set forth efficient processing to train machine learning based image processing models that are used in image processing systems to infer the location and orientation of micro-objects within captured images of a surface while the micro-objects are being manipulated across that surface and to efficiently track individual objects within the different images of a time sequence of images capturing the movement of micro-objects across the surface.

The below described systems and methods are directed to development of processing that is included in a micro-assembler system that utilizes a deep-learning computer vision algorithm to simultaneously detect and track up to thousands of micro-objects in each captured image of a time sequence of images, where processing of images is sufficiently fast (e.g., less than one tenth of a second for each image) to enable real-time control of a micro-assembler station based on inferences generated by such processing. In an example, images are captured at a rate of less than one (1) image every one hundred (100) mS.

In some examples, the below described systems and methods include processes to infer movement of a micro-object on a micro-assembler backplane surface over a time duration between times that images of that surface are captured. In some examples, these processes use information regarding controlled forces exerted on micro-objects during that time duration to augment tracking of micro-objects as they move across the surface of a micro-assembler backplane. In an example, information describing the profile of electric forces across the surface of the micro-assembler backplane during a time duration is used to estimate the movement of micro-objects on that surface during that time duration. For example, a location on a micro-assembler backplane surface of a micro-object identified in a first image of a time sequence of images is combined with the estimated movement of that micro-object during a time duration, as determined by the information indicating the profile of electric forces on the micro-assembler backplane surface during the time duration after capture of the first image, to estimate the location of that micro-object in an image of the micro-assembler backplane that is captured after that time duration. This estimated location is compared to locations of micro-objects identified a second image that is captured after the time duration elapses after the first image is captured. This combination provides more efficient processing to track the movement of micro-objects across the images in a time sequence of images of the micro-assembler surface.

The below described systems and methods in an example include one or more of four general areas: (i) automatically generating a training data corpus that in an example is used to augment a training data corpus to more efficiently enable training of deep-learning image processing and recognition models to be incorporated into machine learning based image processing; (ii) transfer, prior to operation of a micro-assembler, of the trained deep-learning image processing and recognition models to image recognition processors operating with micro-assembler controllers; (iii) use the image recognition processors that incorporate the deep-learning image processing and recognition model operating with micro-assembler controllers to detect micro-object locations while the micro-assembler is running; and (iv) use a model of motion for micro-objects under the generated electric forces on the surface to augment tracking of the location of individual micro-objects from image to image at micro-assembler run-time.

Training Data Generation and Training Corpus Augmentation

Training of deep learning models typically require large amounts of data. Collecting such suitably large amount of data, and ensuring that the collected data covers a sufficiently large range of possible observations, is often a costly and time-consuming task. Creating data with accurate "ground truth" information, i.e., data that has known characteristics that are to be inferred and where that data is specified to the training algorithm, is particularly costly and time-consuming. In the below described example of training deep-learning image processing and recognition models to infer the location, orientation, other aspects, and movement of micro-objects in a time series of captured images, training image data is automatically synthesized so that a large variety of training images with known characteristics, such as the location and orientation of micro-objects in the images, is efficiently generated along with accurate ground truth data for each training image. In an example, a composite set of label data containing the ground truth data, such as location and orientation, for each micro-object in the synthesized training image is generated along with the synthesized training image.

In an example, an available image processing software package, referred to as OpenCV, is used to process a relatively small number of images captured during operations of a micro-assembler system. This package was used to extract a fixed background pattern in the captured images, where the fixed background corresponds to a surface of a micro-assembler backplane as is described below and includes an array of electrodes visible on the surface in this example. The package was also used to extract the shapes of micro-objects, i.e., sub-images where various sub-images of the captured images each contains a respective image of a micro-objects with various orientations. In the following description, such sub-images that contain a view of a micro-object are referred to an object image. Additional training images for a training data corpus in an example is synthesized by superimposing a number of those sub-images at various positions on top of a copy of the extracted background image, where each sub-image depicts a micro-object at one of a number of various orientations. By synthesizing training images with objects at known locations and orientations allows automatic creation of accurate ground truth data for each synthesized training image.

In an example, the efficiency of image recognition processing is improved by simplifying certain aspects of the image recognition process. In an example, a deep-learning image processing and recognition model is developed that is not configured to explicitly resolve the orientation of object detected in images but instead the model only resolves the location of the recognized object. In order to also provide orientation information, the model is trained to recognize a number of what are considered by the model to be "different" objects which are the same object but at different orientations. In other words, the processing operates to identify a particular object in an image as one of a number of different objects, where those different objects are all the same physical object but appearing with different orientation. This allows for a less complex deep-learning image processing and recognition model and facilities, for example, faster processing of images. In one example, the deep-learning image processing and recognition model is trained to recognize a number of objects that each has a different orientation and the model will return an inference that the object in the image is the object that it has been trained to recognize with the closest orientation angle.

FIG. 1 illustrates a micro-assembler station 100, in accordance with an example. The micro-assembler station 100 depicts an apparatus for controlling placement of micro-objects 120 onto a surface 102 of a micro-assembler backplane 110. The micro-assembler station 100 operates to move, hold in place, or control the placement (e.g., manipulation or control of one or more of the location or orientation) of the micro-objects 120 on the surface 102 of the micro-assembler backplane 110 using various techniques. In an example, the operation of the micro-assembler station 100 includes determining the location and orientation of micro-objects on the surface 102 by automated processing of images captured of the surface 102 as placement of the micro-objects 120 is being manipulated. The operation of the micro-assembler station 100 in some examples also tracks the movement of micro-objects across the surface 102 as the micro-objects are manipulated under the control of the micro-assembler station 100. The below described systems and methods in some examples operate to support more efficient training of machine learning based image processing of those captured images to support the operation of such a micro-assembler station 100. The design and operation of a micro-assembler station 100 is described in further detail in U.S. Pat. No. 11,203,525, the entire contents of which is incorporated herein by reference.

The illustrated micro-assembler station 100 has a micro-assembler backplane 110 that interoperates in this example with a light emitting device 160 and a camera 170. A computing device 150 is an example of a controller that receives images from the camera 170 and controls the light emitting device 160 based on images received from the camera. The illustrated micro-assembler backplane 110 includes a substrate layer 111 and a dielectric layer 114. In this example, the dielectric layer 114 has a number of phototransistors 112 and electrodes 113 located therein. The electrodes 113 in various examples are arranged in proximity to and distributed across the surface 102 of the micro-assembler backplane 110 and in some examples on top of or beside the phototransistors 112. In various examples, the substrate layer 111 is able to be a glass substrate or made of another material and has a bottom 104 onto which light patterns are able to be projected.

In some examples, the light emitting device 160 shines a variable light pattern 162 onto the bottom 104 of the micro-assembler backplane 110. This variable light pattern 162 selectively illuminates one or more of the phototransistors 112 to activate electrodes 113 connected to that phototransistor 112. In various examples, the voltages applied to the electrode 113 in various examples generate one or more of dielectrophoretic (DEP) forces, electrophoretic (EP) forces, or both, that act upon the micro-objects 120 in the vicinity of electrode 113 that are activated. In the following discussion, the term "electric forces" are used to describe DEP, EP, other forces, or combinations of these, that are generated across the surface 102 of the micro-assembler backplane 110 to move micro-objects. The DEP and EP forces that are exerted on the micro-objects 120 in various examples cause the micro-objects 120 to move around the surface 102 of the micro-assembler backplane 110. Thus, the dielectrophoretic (DEP) and electrophoretic (EP) forces are used to control the placement (e.g., location, orientation, other characteristics, or combinations of these) of micro-objects 120 on the surface of the micro-assembler backplane 110. In further examples, a micro-assembler backplane is able to have any suitable design to create electric forces on its surface to manipulate micro-objects.

The micro-assembler station 100 operates to relocate, reorient, otherwise manipulate, or combinations these, the micro-objects 120 on the surface 102 in order to cause a determined number of micro-objects to be placed into defined locations on the surface 102. An example of such an operation includes placing micro-object elements onto a video display panel as part of construction of such a video display panel.

In an example, the micro-assembler station 100 operates to determine a present location of the micro-objects 120 on the surface 102. In the illustrated example, the camera 170 captures a time sequence of images of the surface 102 along with the micro-objects 120 thereon, and provides that time sequence of images to an image receiver 140 that is connected in an example to the computing device 150 to allow the computing device to receive the time sequence of images.

The illustrated computing device 150 has a micro-assembler controller 158 that controls the operation of the micro-assembler station. The computing device 150 includes control data 151 that includes programs and data used to control the operation of the equipment contained in the micro-assembler station 100.

The computing device 150 also includes an image recognition processor 152 that is an example of an image processor that processes the received time sequence of images produced by the camera 170. Image processing of those images by the image recognition processor 152 identifies characteristics, such as location, orientation, other characteristics, or combinations of these, of each micro-object 120 located on the surface 102. In an example, the image recognition processor 152 performs image processing that is based on a machine learning process that is trained, at least in part, with data that is generated by systems and methods described below.

The micro-assembler controller 158 performs control functions for the micro-assembler station 100 and performs processing to determine how the micro-objects are to then be moved to place the micro-objects 120 into their desired locations on the surface 102. The micro-assembler controller 158 performs the processing to control the components of the micro-assembler station 100 based at least in part on the determined present location of the micro-objects 120 on the surface 102. In an example, the micro-assembler controller 158 determines a time sequence of force profiles to be applied to the micro-objects 120 across the surface 102 in order to move those micro-objects 120 into their desired locations. Processing within the micro-assembler controller 158 then determines a time sequence of variable light patterns 162 where each variable light pattern 162 illuminates selected phototransistors 112 to create one of the force pattern profiles in the time sequence of force profiles that are to be applied to the micro-objects 120. Processing within the micro-assembler controller 158 causes the light emitting device 160 to sequentially project that time sequence of variable light patterns 162 onto the back of the micro-assembler backplane 110, and thereby create a determined electric force profile across the surface 102.

In an example, the computing device 150 includes a micro-object tracking processor 154 that is an example of a movement processor that processes a time sequence of images captured by the camera 170 as micro-objects 120 are moving across the surface 102. The micro-object tracking processor 154 in an example operates to track individual micro-objects as they move across the surface 102 of the micro-assembler backplane 110. The micro-object tracking processor 154 in an example augments the processing of images collected over a time period with information describing the determined time sequence of force profiles, as generated by algorithms in the micro-assembler controller 158 and communicated to the micro-object tracking processor 154, to improve processing to track moving micro-objects across images captured at different times in that time period. In an example, processing by the micro-object tracking processor 154 incorporates processing described below to track the movement of a particular micro-object in a first image by estimating a predicted location of that particular micro-object at a time of a future image based on the force profiles applied by the electrodes on the surface 102 at the time of the future image and inferring that a micro-object captured in that future image that is near that predicted location is the same particular micro-object.

In some examples, an indicator output 156 provides indications to the micro-assembler controller 158 that a tracked micro-object in the first captured image corresponds to a likely image of the tracked micro-object in the second captured image based on an inference of the likely image of the tracked micro-object in the second captured image by the micro-object tracking processor 154. In some examples, this indication facilitates processing to determine controls to apply to components of the micro-assembler station 100 to more efficiently move micro-objects into their desired locations.

Figure 2:
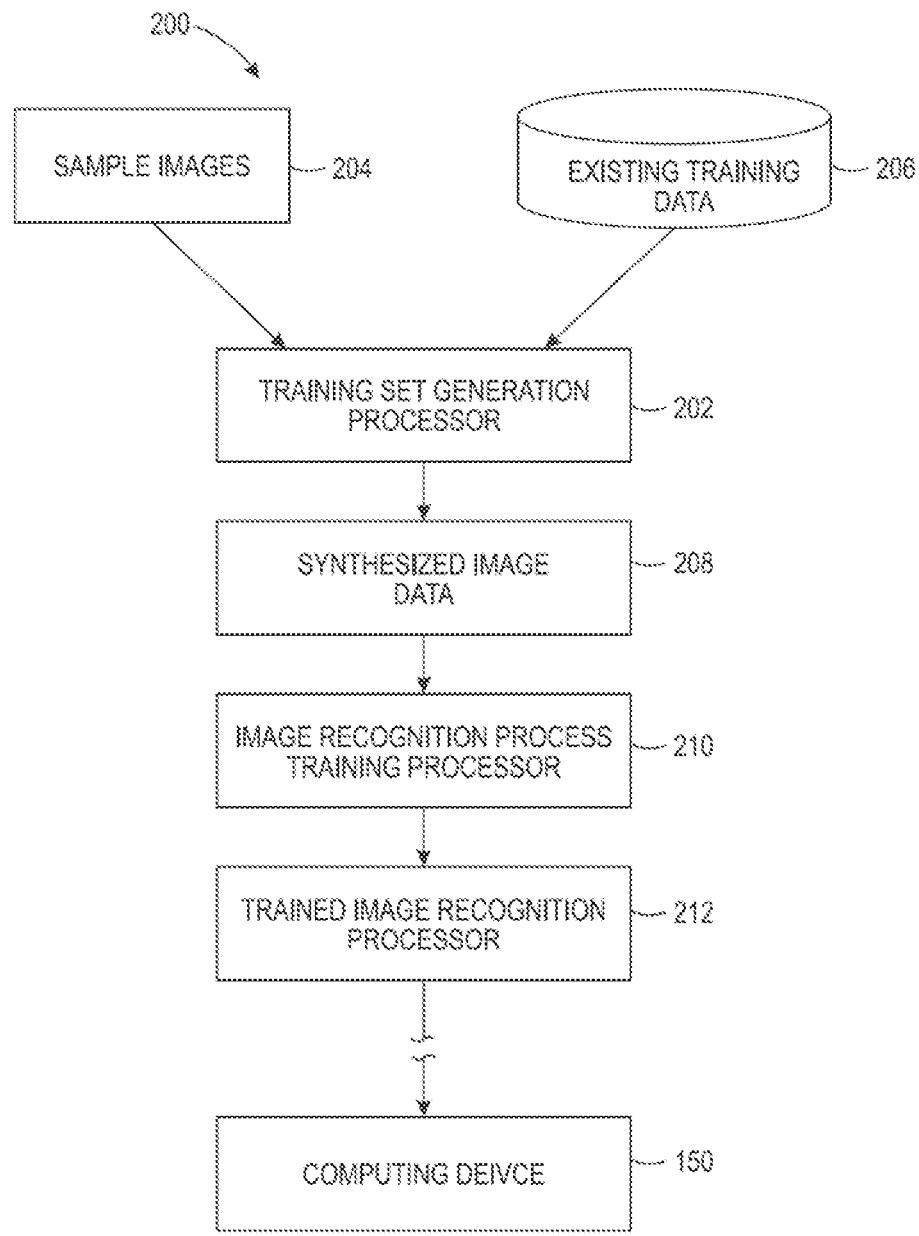
FIG. 2 illustrates a micro-object image recognition data generation data flow, according to an example.

FIG. 2 illustrates a micro-object image recognition training data generation data flow 200, according to an example. The micro-object image recognition training data generation data flow 200 is an example of data flows in a system that automatically produces a training corpus of image data that is used to train a machine learning based image recognition system to recognize the location and orientation of micro-objects in images. In various examples, the micro-object image recognition training data generation data flow 200 operates to, for example, generate such a training corpus without initial training data, operates to augment an existing training corpus, or combinations of these.

The micro-object image recognition training data generation data flow 200 depicts a sample images element 204. The sample images element 204 in an example is a source of images of one or more micro-objects, referred to as a set of object images of micro-objects, where each image depicts a view of a micro-object with a particular orientation. Such images provided by the sample images element 204 are referred to as object images. The provided set of object images of micro-objects have a number of object images where each respective object image in the set of images comprises a respective view of a micro-object having a respective orientation that is associated with the respective view and is different from each respective orientation of micro-objects in other object images within the set of object images.

The sample images element 204 is able to provide a set of object images by any suitable technique. In an example, the sample images element 204 stores a number of object images and provides the stored set of object images to other elements of the micro-object image recognition training data generation data flow 200. In further examples, the sample images element 204 generates some object images in a set of object images by various techniques. In some examples, the sample images element 204 receives a first object image of the micro-object and generates at least some object images in the set of object images by at least manipulating the first object image to generate a respective object image that presents the micro-object in its respective view with a selected orientation. In another example, the sample images element generates at least some object images in the set of object images by at least capturing object images of the micro-object with the micro-object presented with the respective orientation of the respective view.

The micro-object image recognition training data generation data flow 200 depicts a training set generation processor 202 that is an example of a training data set generator. The training set generation processor 202 in an example receives sample images of micro-objects from the sample images element 204 and in some examples is able to receive an existing set of training data 206. The training set generation processor 202 in an example performs a training data set generation process, such as is described below, to produce a dataset of synthesized training images 208 that can be used to train a machine learning based image recognition system to recognize micro-objects in images as well as various physical aspects of those micro-objects, such as the location and orientation of those micro-objects.

The micro-object image recognition training data generation data flow 200 depicts an image recognition process training processor 210 that is an example of a machine learning model training processor. The image recognition process training processor 210 in an example generates a machine learning based image processing model 212 based at least in part on the synthesized training images 208. The machine learning based image processing model 212 in various examples is able to include any type of machine learning based image processing structure, such as a deep learning, deep neural network, one or more other structures, or combinations of these.

The machine learning based image processing model 212 in an example is transferred to the above-described computing device 150 and incorporated into the image recognition processor 152. In an example, the machine learning based image processing model 212 supports processing to detect the location and orientation of micro-objects on the surface 102 of the micro-assembler backplane 110.

Figure 3:
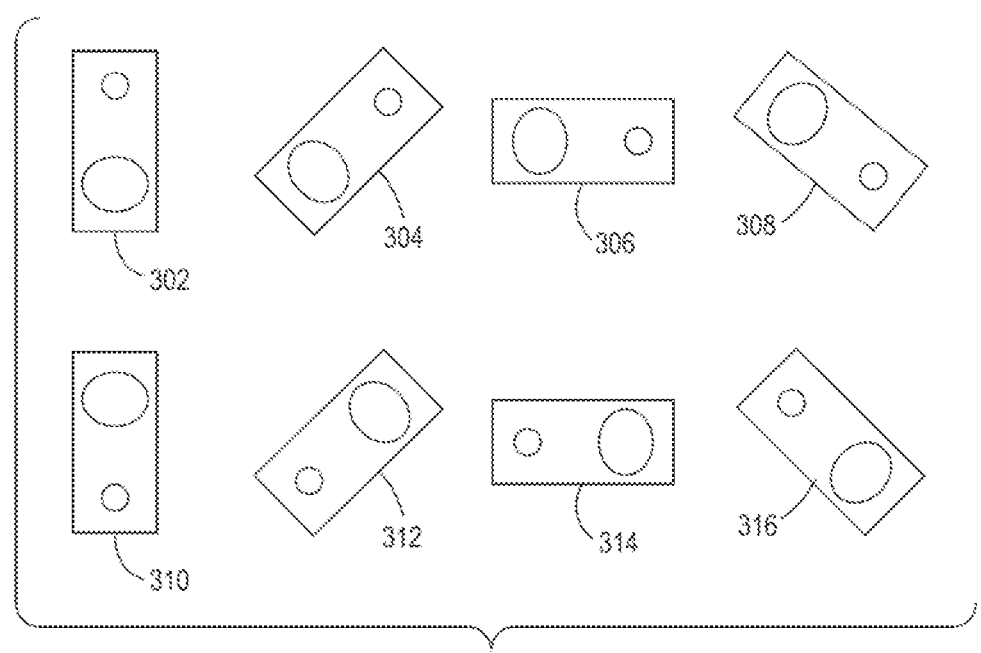
FIG. 3 illustrates a set of object images of an example micro-object, according to an example, according to an example.

FIG. 3 illustrates a set of object images 300 of an example micro-object, according to an example. The set of object images 300 in this example includes a number of object images of a particular micro-object where each object image in the set has a view of the micro-object with a different orientation. In some examples, each object image in the set of object images 300 is an electronically encoded data set that is contained in a separate data file. In some examples, each object image has an associated set of data, such as an associated label or metadata, that is referred to herein generally as a label that describes the type of micro-object in the respective image and also the angle at which that micro-object is captured in that respective image. In an example, the object images in the set of object images are used to generate synthesized images that are used to train machine learning based image recognition processing to recognize the presence and orientation of micro-objects in captured images that are assumed to contain a number of micro-objects at various locations and orientations. In an example, such synthesized images are generated by selecting object images from within the set of object images 300 and placing those object images at various locations within the synthesized training image.

The set of object images 300 in this example include object images that each has a view of a particular micro-object where that view is rotated over a range of three-hundred and sixty (360) degrees over all the object images in the set of object images. In the illustrated example, the views are rotated at forty-five (45) degrees intervals from an "up-down" orientation. This example illustrates a set of object images where the views of the micro-object in the different object images differ from each other by an integer multiple of an offset angle, e.g., the offset angle of fourth-five (45) degrees in this example. It is pointed out that the illustrated micro-object has an asymmetrical appearance to resolve one hundred-and-eighty (180) degree ambiguities.

The present discussion describes a set of object images that contains eight object images that have views with equally separated orientation angles around an axis perpendicular to the image in order to simplify the description of relevant aspects. It is noted that illustrated set of object images 300 only depicts a micro-object that is rotated about one axis, i.e., the axis perpendicular to the image. In general sets of object images are able to include object images with views of a micro-object that are rotated about two or three axes and in the same or different angular increments about teach axis. In general, a particular set of object images is able to have any number of object images of a micro-object where each image depicts views of the micro-object at various angles of orientation where the object images in the set of object images are able to have orientations that change at a uniform interval or at irregular intervals.

The set of object images 300 includes a first image 302 through an eight image 316 that are images with views of a particular micro-object at various orientation angles relative to vertical in that image. The first image 302 contains an object image with a view of the micro-object with a vertical orientation. The second image 304 contains an object image with a view of the micro-object with a forty-five (45) degree orientation relative to vertical in that image. The third image 306 contains an object image with a view of the micro-object with a ninety (90) degree orientation relative to vertical in that image. The fourth image 308 contains an object image with a view of the micro-object with a one hundred and thirty-five (135) degree orientation relative to vertical in that image. The fifth image 310 contains an object image with a view of the micro-object with a one hundred-and-eighty (180) degree orientation relative to vertical in that image, which is to say the micro-object appears "flipped" in the vertical axis in the fifth image 310. The sixth image 312 contains an object image with a view of the micro-object with a two hundred and twenty-five (225) degree orientation relative to vertical in that image. The seventh image 314 contains an object image with a view of the micro-object with a two hundred and seventy (270) degree orientation relative to vertical in that image. The eight image 316 contains an object image with a view of the micro-object with a three hundred and fifteen (315) degree orientation relative to vertical in that image.

In various examples, the object images in a set of object images are able to be generated by any suitable technique. In one example, individual photos or other image capturing processes are able to capture images of a particular micro-object as it is rotated at different orientations. In another example, one image, such as the above described first image 302, is able to be captured by any process and that image is able to be manipulated to rotate the apparent image to have the various orientations desired for the object images to be contained the set of object images. In yet further examples the object images in the set of object images are able to be generated by any suitable technique that may or may not incorporate an actual micro-object, such as by artistically generating, either manually or autonomously, object images of a particular micro-object that is to be included in each image.

Figure 4:
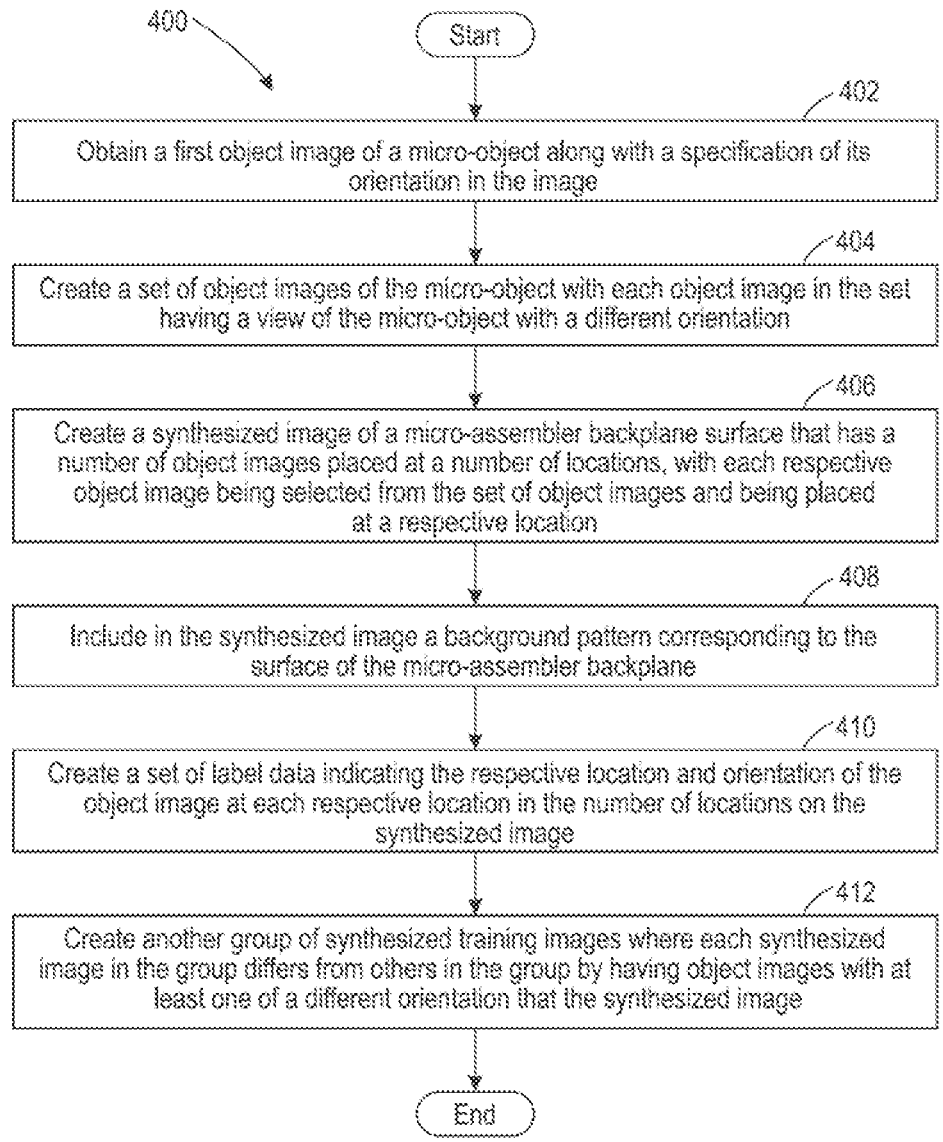
FIG. 4 illustrates an augmented micro-object data set generation process flow, according to an example.

FIG. 4 illustrates an augmented micro-object data set generation process flow 400, according to an example. The augmented micro-object data set generation process flow 400 is an example of a process performed by the above-described micro-object image recognition training data generation data flow 200 to generate an augmented training image data set for training a machine learning based image processing model. Such training is able to include, for example, training to perform inference of locations and orientations of micro-objects captured in images.

The augmented micro-object data set generation process flow 400 obtains, at 402, a first object image of a micro-object with a specification of its orientation in the image. In an example, the first object image contains a view of a micro-object that was captured by a camera or other means. In further examples the first object image is able to be obtained by any suitable technique such as drawing or other synthesis of an image of the micro-object. In various examples, a first object image is able to be provided by a sample image element, such as the sample image element 204 described above. The orientation of the view of the micro-object in the first object image is able to be specified by any suitable technique, such as metadata associated with the first object image that specifies the orientation of the micro-object in that object image.

The augmented micro-object data set generation process flow 400 generates, at 404, a set of object images of the micro-object with each object image in the set having a view with a different orientation. In various examples, the different object images in the set of object images are able to be obtained by any suitable technique. In an example, images of the micro-object are captured, such as by a camera, where the micro-object has different orientations in each image, and those images are provided by a sample image element as is described above. In a further example, the process is able to manipulate the first object image by any suitable means to synthesize object images of the micro-object with different orientations. In various examples, the set of object images is able to have the micro-object presented with different orientations that are rotated about one, two, or three axes. In some examples, the object images in the set of object images have views of a micro-object that have different orientations that differ from each other by an integer multiple of an offset angle.

A synthesized image of a micro-assembler backplane surface is generated, at 406. This synthesized image has a number of object images, which is an example of a selected plurality of object images, placed at a number of locations, with each respective object image being selected from the set of object images and being placed at a respective location in the synthesized image. As is described above, each selected object image has an associated orientation so the placed image has a defined location and orientation.

A background pattern corresponding to the surface of the micro-assembler backplane is included in the synthesized image, at 408. In an example, the background pattern includes a background image similar to the micro-assembler backplane surface 500, described below, that is added to the synthesized image of a micro-assembler backplane surface by modifying the synthesized image by adding that background pattern so that the images of the micro-objects are superimposed on that backplane surface image.

A set of label data indicating the respective location and orientation of the micro-object contained in the synthesized image at each respective location in the number of locations on the synthesized image is generated, at 410. This set of label data in an example is a composite set of label data that can include metadata associated with the synthesized image and is generated based on the location of the images placed in the synthesized image and the orientation of the micro-object in each of those images where the orientation of the micro-object is determined based on metadata, such as a label, associated with that image.

Another group of synthesized training images is generated, at 412. In an example, generating another group of synthesized training images generates a group with a number of different synthesized training images where each respective synthesized training image in the group differs from others in the group by having at least one object image with at least one of: a different location within the synthesized training image; or with a different orientation, than object images in other synthesized training images. The augmented micro-object data set generation process flow 400 then ends.

Figure 5:
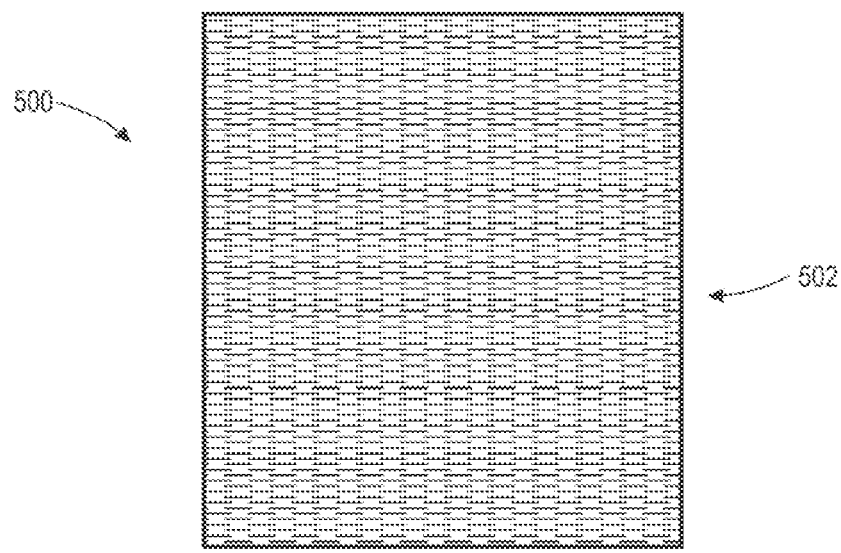
FIG. 5 illustrates an image of a micro-assembler backplane surface, according to an example.

FIG. 5 illustrates an image of a micro-assembler backplane surface 500, according to an example. The image of the micro-assembler backplane surface 500 is an example of a background pattern that is added to a synthesized training image and is a visual image of the above-described surface 102 of the micro-assembler backplane 110. This image is similar to an image of the surface 102 that would be captured by camera 170 with no micro-objects on the surface. In an example, this image would be similar to such a captured image where that image would be transferred to the computing device 150 for processing by the image recognition processor 152 and micro-object tracking processor 154 during operations of the micro-assembler station 100. In general, an image of the micro-assembler backplane surface 500 is able to be obtained by any suitable technique, such as capture of an image by a camera of a micro-assembler backplane surface, generation of a simulated image, other techniques, or combinations of these.

Figure 6:
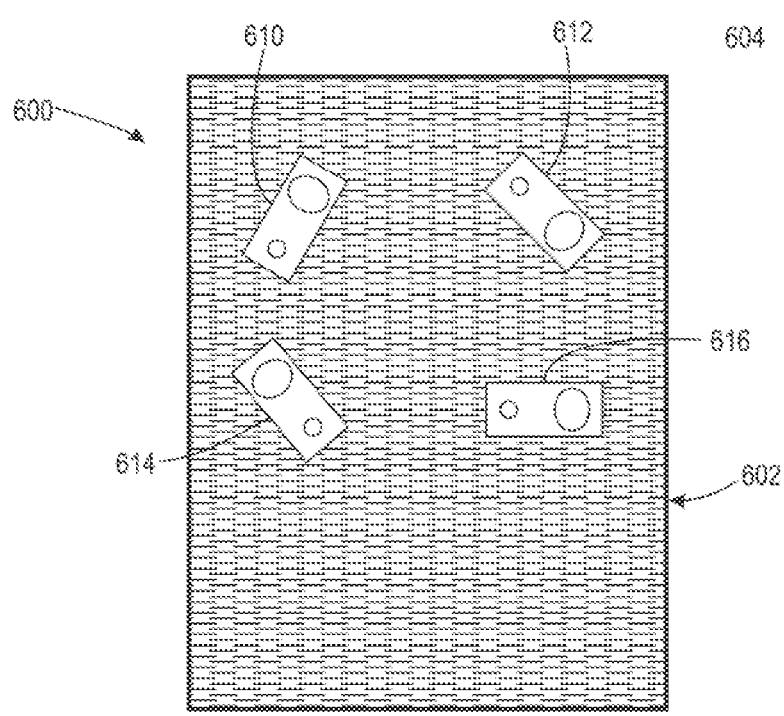
FIG. 6 illustrates a synthesized training image, according to an example.

FIG. 6 illustrates a synthesized training image 600, according to an example. The illustrated synthesized training image 600 is an example of an image generated by the above-described augmented micro-object data set generation process flow 400 and is a generated image that simulates an image of a micro-assembler backplane surface onto which a number of micro-objects are placed with each micro-object having a respective orientation. In general, a large number of different synthesized training images each with different arrangements of images therein are able to be generated and used to train image recognition processes, such as the above-described image recognition processor 152.

In general, a synthesized training image 600 is a data set formatted according to any suitable format to define the image. In an example, the synthesized training image 600 is formatted according to the format produced by the camera 170 and delivered to the computing device 150. Examples of such formats include, but are not limited to, bit maps, JPEG, TIFF, other formats, or combinations of these. In various examples, the format of the date defining the synthesized training image 600 is able to be in any suitable format that is similar to or different from the format of images provided by the camera 170.

The synthesized training image 600 includes a background pattern 604 and images of micro-objects disposed at various locations in the synthesized training image 600 with various orientations. In an example, the background pattern 604 is an example of the above-described image of a micro-assembler backplane surface 500. The synthesized training image 600 includes a first micro-object image 610 that is shown at a first location on the backplane surface and thus the background pattern 604, a second micro-object image 612 is shown at a second location on the backplane surface, a third micro-object image 614 is shown at a third location on the backplane surface, and a fourth micro-object image 616 is shown at a fourth location on the backplane surface.

The first micro-object image 610 shows a micro-object with a forty-five (45) degree angle from vertical, The first micro-object image 610 shows a micro-object with a three hundred-and-fifteen (315) degree angle from vertical, the second micro-object image 612 and the third micro-object image both show a respective micro-object with a three hundred-and-fifteen (315) degree angle from vertical, and the fourth micro-object image 616 shows a micro-object with a forty-five (45) degree angle from vertical The synthesized training image 600 is shown to have four (4) micro-object images thereon in order to simplify the description of relevant aspects of the present example. In general, a synthesized training image 600 is able to have any number of micro-object images depicted on the backplane surface.

In an example, the synthesized training image 600 is generated by a processor by assembling various images, such as various object images and a background image, into a synthesized training image 600. In an example, as is described above with regards to the augmented micro-object data set generation process flow 400, the synthesized training image 600 is generated by determining locations at which to locate images of micro-objects on the backplane surface, and thus within the synthesized training image 600. The orientation of the respective micro-object in each image to be selected is also determined by the process. In an example, images of the micro-object at the determine orientation is taken from the set of object images 300 and inserted into the synthesized training image 600. An image of a micro-assembler backplane surface, such as the above-described image of a micro-assembler backplane surface 500, is then added to the synthesized training image 600 so that the images of the micro-objects are superimposed on that backplane surface image.

Each image of a micro-object that is placed into the synthesized training image 600 has its respective location in the image and the orientation of that image stored in a set of metadata that is associated with the synthesized training image 600. For example, such metadata for the synthesized training image 600 identifies a micro-object with orientation of three hundred and fifteen (315) degrees is at the first location, identifies another micro-object with orientation of three hundred-and-fifteen (315) degree orientation at the second location, identifies another micro-object with orientation of three hundred-and-fifteen (315) degrees at the third location, and identifies another micro-object with orientation of ninety (90) degrees at the fourth location.

Figure 7:
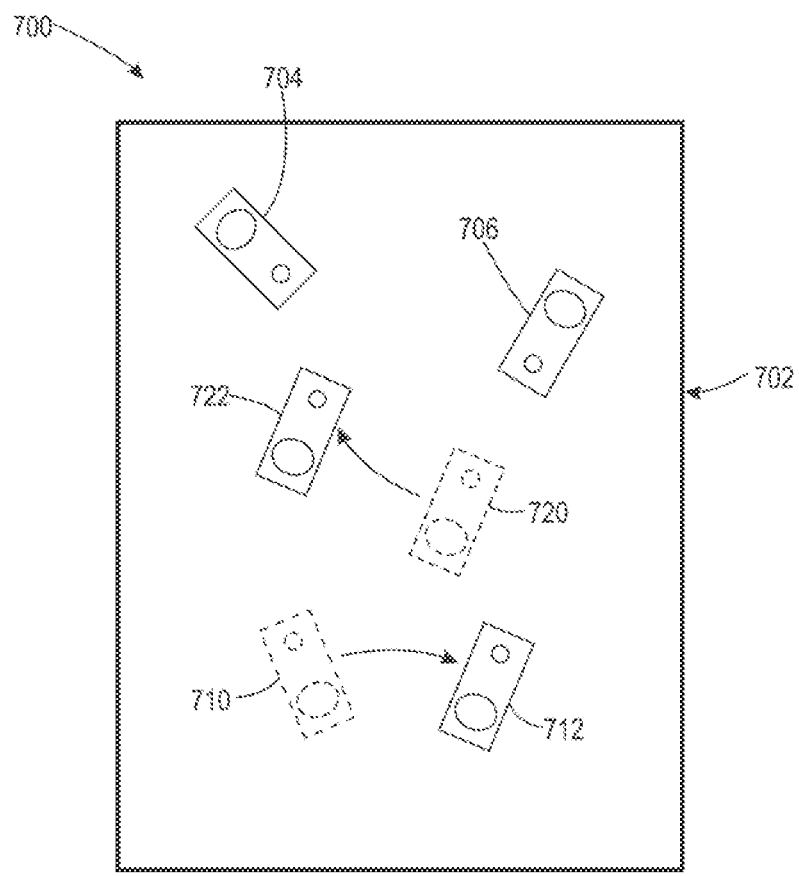
FIG. 7 illustrates an example captured image of a micro-assembler backplane with moving micro-object, according to an example.

FIG. 7 illustrates an example captured image of a micro-assembler backplane with moving micro-object 700, according to an example. The example captured image of a micro-assembler backplane with moving micro-object 700 is a captured image that depicts the present location of micro-objects on a surface 702 of a micro-assembler backplane at captured at a point in time, and also depicts progression of a plurality of micro-objects moving across the micro-assembler backplane under control of the micro-assembler station by also depicting a previously observed location of two of those micro-objects as captured in a previously captured image.

The example captured image of a micro-assembler backplane with moving micro-object 700 includes a surface 702 of a micro-assembler backplane on which are placed a first object image 704 and a second object image 706. Also depicted is a third object image 712 that is shown at a present location on that surface 702. The micro-object that is captured in the third object image 712 on the surface 702 was observed in a previously captured image of the backplane at a first prior location 710, where that previously captured image was captured at a known time duration before the capture of the example captured image of a micro-assembler backplane with moving micro-object 700. A fourth object image 722 is also shown at a present location on that surface 702 and the micro-object that is captured in the fourth object image 722 on the surface 702 was observed in the above described previously captured image of the backplane at a second prior location 720, where that previously captured image was captured at the known time duration before the capture of the example captured image of a micro-assembler backplane with moving micro-object 700. In order to more clearly depict relevant aspects, the first prior location 710 and second prior location 720 are shown represented in dotted outline. The movement of the micro-object during the time duration between the captured image and the previously captured image is caused by electric forces generated on the surface of the micro-assembler backplane. As discussed above, the operation of the micro-assembler backplane determines the electric forces that are produced on the surface 702 and thus the contours of those electric forces are known.

Processing by the computing device 150 of a time sequence of images by the camera 170 while micro-objects are moving is enhanced by augmenting the image processing with additional information concerning the forces applied to the micro-objects. For example, it is noted that the first prior location 710 and the second prior location 720 are close to the location of the third object image 712 and also to the location of the fourth object image 722. Simple processing of the two images captured at different times would lead to an ambiguity as to which micro-objects in the previously captured image correspond to the third object image 712 and the fourth object image 722. As discussed below, in an example, processing of a time sequence of images is augmented with information regarding the electric forces applied across the surface 702, and thus on the micro-objects, to aid in resolving the ambiguity regarding which micro-objects in prior images correspond to particular images of micro-objects in a present image. Such processing is described in further detail below.

The example captured image of a micro-assembler backplane with moving micro-object 700 depicts the movement of two micro-objects to simplify the description of relevant aspects. In general, a surface 702 of a micro-assembler is able to have any number of micro-objects thereon and any or all of those micro-objects are able to move between the time of capture of different images while a micro-assembler station 100 is in operation.

Figure 8:
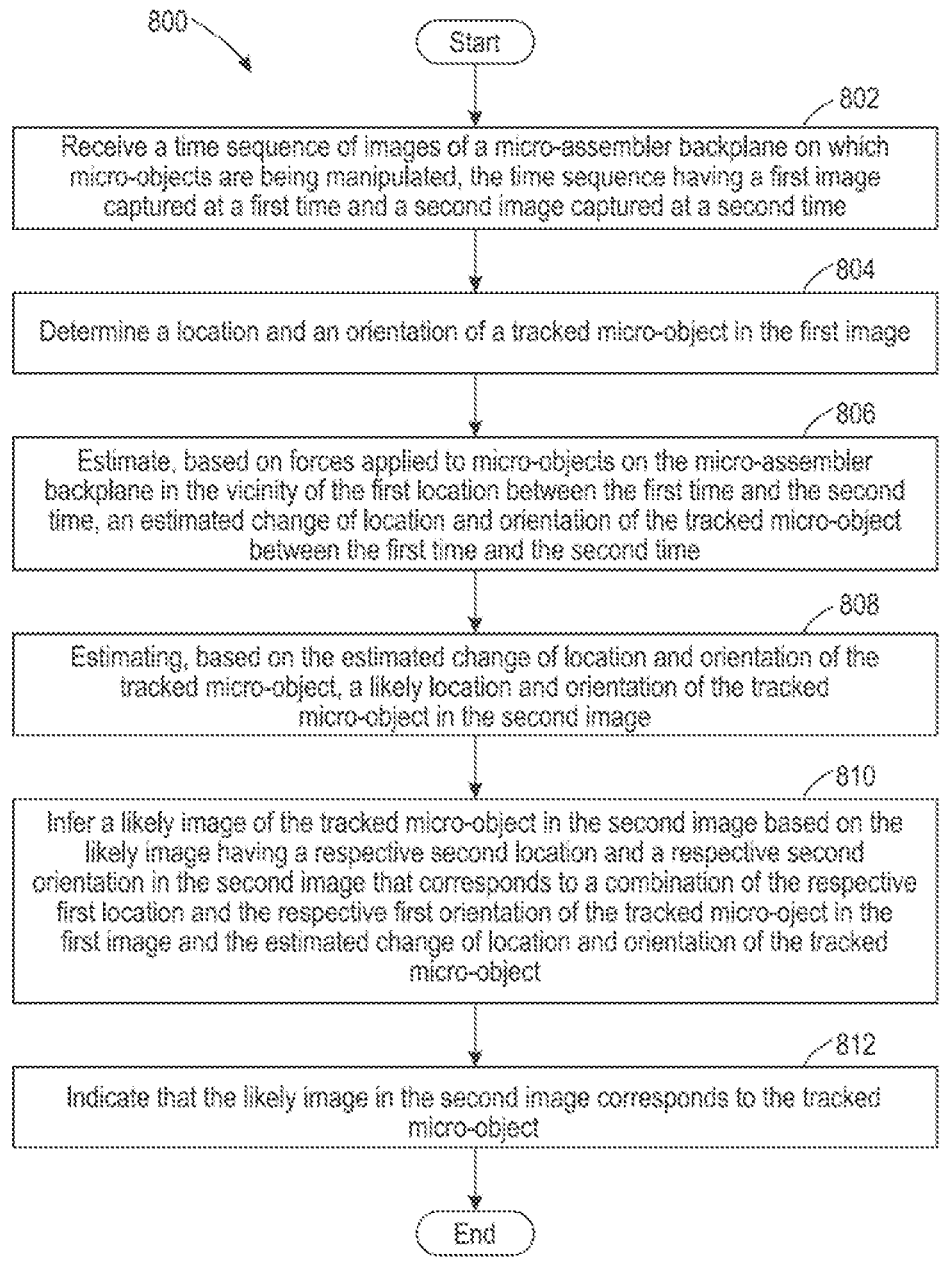
FIG. 8 illustrates an example process to infer movement of a micro-object on a micro-assembler backplane surface over a time duration, according to an example.

FIG. 8 illustrates an example process to infer movement of a micro-object on a micro-assembler backplane surface over a time duration 800, according to an example. The example process to infer movement of a micro-object on a micro-assembler backplane surface over a time duration 800 is an example of a process performed by the computing device 150 described above to support processing of a received time sequence of images. The example process to infer movement of a micro-object on a micro-assembler backplane surface over a time duration 800 allows more efficient processing of a time sequence of images to track the movement of each particular micro-object over time, such as is described above with regards to the example captured image of a micro-assembler backplane with moving micro-object 700.

The example process to infer movement of a micro-object on a micro-assembler backplane surface over a time duration 800 receives, at 802, a time sequence of images of a micro-assembler backplane on which micro-objects are being manipulated. The time sequence in an example has at least a first image that is captured at a first time and a second image that is captured at a second time. In an example, the time sequence of images is captured by the above-described camera 170 over a time duration including the first time and the second time where the computing device is controlling the light emitting device 160 to cause electric forces to be produced across the surface 102 of the micro-assembler backplane 110. In an example, the time duration between the capture of the first image and the second image, i.e., the difference between the first time and the second time, is referred to as a time difference.

A location and an orientation of a tracked micro-object in the first image is determined, at 804. In an example, the identification of micro-objects in each image in the received time sequence of images is performed by the computing device 150 using an image recognition processor 152 that is trained by training data generated as is described above. As described above, this processing identifies the location and orientation of each micro-object in each received image in the time sequence of images.

The example process to infer movement of a micro-object on a micro-assembler backplane surface over a time duration 800 estimates, at 806, based on estimates of forces applied to micro-objects on the micro-assembler backplane in the vicinity of the first location between the first time and the second time, an estimated change of location and orientation of the tracked micro-object between the first time and the second time. This is an example of estimating a calculated movement for a tracked micro-object captured with a first location in the first captured image in the time sequence of images during the time difference. In an example, this is performed by the above-described micro-objected tracking processor 154 by processing a time sequence of images received from the camera 170.

The example process to infer movement of a micro-object on a micro-assembler backplane surface over a time duration 800 estimates, at 808 based on the estimated change of location and orientation of the tracked micro-object, a likely location and orientation of the tracked micro-object in the second image. In an example, this estimation further includes determining, for the second image, a respective second location and respective second orientation of each respective micro-object on the micro-assembler backplane. In various examples, this estimate is based upon the above determined location and orientation of the micro-object and the determined estimated change of location and orientation.

The example process to infer movement of a micro-object on a micro-assembler backplane surface over a time duration 800 infers, at 810, a likely image of the tracked micro-object in the second image. This inference, in an example, is based on the likely image having a respective second location and a respective second orientation in the second image that corresponds to a combination of the respective first location and the respective first orientation of the tracked micro-object in the first image and the estimated change of location and orientation of the tracked micro-object The example process to infer movement of a micro-object on a micro-assembler backplane surface over a time duration 800 indicates, at 812, that the likely image in the second image corresponds to the tracked micro-object.

Example Implementation

An experimental prototype implementation of the above-described systems and methods demonstrates their advantages. In an example, a deep learning model for precise object classification was refined by utilizing the data set of images generated through the above-described data augmentation. An available object detection and image segmentation model widely employed in various fields such as autonomous vehicles, security and surveillance, and medical imaging was used that is referred to as the YOLO (You Only Look Once) model.

The YOLO model processes images captured by a high-speed camera and accurately classifies objects within them, such as identifying the above-described micro-object. In the example of this highly accurate and efficient image recognition processor, the YOLO model excels in object detection but does not have the ability to measure the orientation of the detected micro-objects.

In this example, in accordance with the above-described system and methods, the angle domain of recognized objects, e.g., micro-objects, was discretized into a set of classes, where each class corresponds to a specific angle value. This transforms the single class classification problem into a multi-class classification problem by adding the angle feature to the micro-object's location. In other words, the processing operates to identify a particular object in an image as one of a number of different objects, where those different objects are all the same physical object but appearing with different orientation. This obviates a lack of orientation determining capability in the YOLO package. In addition to the image sample, YOLO utilizes information about the object class and its bounding box. The class number corresponds to a micro-object orientation and the bounding box is represented by a tuple containing the center and dimension of the box.

The example experiments yielded improvements by fine tuning the YOLO model with training data for 100 epochs that was synthesized according to the above-described systems and methods.

In this example experiment, the trained YOLO based image processor deduced the locations and orientations of micro-objects within an image, such as the synthesized training image 600. The machine learning based image processor processes an image as input and generates a set of outcomes that include a list of object classes for each identified micro-object that identify the orientation, along with the respective bounding box of each identified image portion. Each bounding box in this example is represented by a tuple that contains the coordinates of the bounding box and its dimensions in pixels.

To enhance the scalability of the inferences with regards to the number of micro-objects and the image size, the captured image that is being analyzed is divided and processed by the machine learning based image processor into smaller, overlapping sub-images and perform inferences on each individual sub-image. The overlapping sub-images address the cases where micro-objects are situated at the boundaries between images. The case of a micro-object being situated at boundaries may lead to misclassifications as it would not be fully captured in the smaller sub-images.

The above-described example process to infer movement of a micro-object on a micro-assembler backplane surface over a time duration 800 uses information regarding the forces on micro-objects to augment tracking of micro-objects as they move across the surface of a micro-assembler backplane. Elements of processing to determine these forces is described below.

The following uses the notation $$x_k^i$$

to denote the locations of micro-object i at time $t_k$, and $$x_{k+1}^i$$

to represent the micro-object location at time $t_{k+1}$. The YOLO image processing algorithm used in this example processes individual images in a time sequence of images in order to make inferences for micro-object locations and orientations, i.e., it can generate the set of locations $x_{k+1}^j$.

This algorithm, however, is not adapted to accurately determine which indexed micro-object that is associated with index j at time $t_{k+1}$ (i.e., is identified in an image captured at $t_{k+1}$) corresponds to a micro-object with index i at time $t_k$ (i.e., is identified in an image captured at $t_{k+1}$). In other words, the processing does not explicitly track which micro-object in a present image corresponds to a micro-object in a previous image when the micro-objects are moving between the capture of those two images. Adding processing to perform such micro-object tracking across images to the machine-based learning image processing models improves processing to direct the operation of a micro-assembler station 100.

In an example, the processing of a time sequence of images incorporates a model of motion specific to micro-objects under various electric forces to augment the image recognition processing that is otherwise performed on an image-by-image basis. Incorporating such a model of motion improves the efficiency of processing to identify and track micro-objects during operations of a micro-assembler station 100. In the operation of a micro-assembler station 100, as is described above, dielectrophoretic (DEP) and electrophoretic (EP) forces that act on the micro-objects are generated by selectively applying electrical potentials to various electrodes in an array of electrodes across a surface of a micro-assembler backplane. In addition to those electrical forces, additional forces acting on the micro-objects include a viscous drag force that is proportional to the micro-object's velocity and that opposes the micro-object's motion. The modelling used in this experiment disregards acceleration since the mass of micro-objects is negligible.

Based on the above, a stochastic dynamic model for micro-object motion is represented by:

$$dx = \frac{1}{\mu}F(x)dt + \sigma d\omega$$

where dx represents movement of the micro-object, ω represents a Wiener process, and σ is a variance parameter. The vector of forces F is formally expressed as F(x)=∇U(x), where U(x) is the potential energy of the particle (e.g., a micro-object) that is given by:

$$U(x) = \frac{1}{2}\sum_{i=1}^{N} C_i(x)[V_i - V(x)]^2$$

where $C_i(x)$ is the capacitance between the particle and electrode i, $V_i$ is the electric potential of electrode i, V(x) is the electric potential of the particle assuming uniform distribution across the particle, and N is the number of actuated electrodes.

The steady state particle potential is expressed by the following equation based on potentials created by the activated electrodes that are across the surface 102 of the micro-assembler backplane 110:

$$V(x) = \frac{1}{\sum_{i=1}^{N} C_i(x)} \sum_{i=1}^{N} C_i(x)V_i$$

The control algorithm, such as is performed by the above-described micro-assembler controller 158 in the computing device 150, for assembling micro-objects determines a set of electric potentials $V_i$ that are applied to the electrodes across the surface 102 of the micro-assembler backplane 110 during each time interval between captures of images of the surface 102 and the micro-objects thereon. Processing evaluating the above equations is an example of determining the respective potential of each respective micro-object in the plurality of micro-objects by at least determining an electric potential profile across the micro-assembler backplane during the time duration based upon selective activation of a subset of electrodes in the plurality of electrodes during the time duration. This processing is also an example of receiving indications of the selective activation of the subset of electrodes during the time duration; and calculating the electric potential profile based on the indications of the selective activation of the subset of electrodes during the time duration.

Based on the values of the electric potentials $V_i$ that are applied to array of electrodes and the locations of micro-objects at time $t_k$, the motion model is used to estimate the locations of micro-objects at time $t_{k+1}$, i.e., determine a calculated motion of the micro-objects. In an example, the processing is assumed to have sufficiently small time steps between images $h=t_{k+1}-t_k$ that the continuous stochastic differential equation is able to be approximated by a discrete stochastic equation given by:

$$x_{k+1} = x_k + \frac{h}{\mu}F(x_k, V) + v_k$$

where $v_k$ is a Gaussian random process that is independently and identically distributed with a mean of zero and a variance of σ, and the vector V=[V1, V2, . . . ] represents the potentials of the electrodes.

This discrete model generates a probability density function for the location of a particular micro-object at time $t_{k+1}$, i.e., a probability density function denoted as $f(x_{k+1}|x_k, V_k)$. It is noted that under the assumption that $v_k$ follows a Gaussian distribution, this density function is also Gaussian. Processing evaluating the above equations is an example of estimating the calculated movement of the tracked micro-object during the time duration by at least: determining a respective potential of each respective micro-object in the plurality of micro-objects during the time duration; and determining a respective calculated motion for each respective micro-object during the time duration wherein the respective calculated motion is based on the respective potential of each respective micro-object during the time duration, wherein the calculated movement of the tracked micro-object during the time duration is based on the respective calculated motion for each respective micro-object.

In an example, a maximum likelihood approach is used to estimate the correlations of micro-objects between images in a time sequence of images, i.e., infer which micro-objects in a subsequently captured image correspond to micro-objects as were detected in images captured at consecutive time steps given the observed locations of micro-objects in the captured images and the electric force profile generated across the surface 102 between the capturing of those images. Where i indicates a particular micro-object in a first captured image and j indicates a particular micro-object in a later captured image, the probability density functions at points $x_{k+1}^j$ and $x_k^i$ for all possible i, j pairs are evaluated in an example and +1 associations between indices at consecutive time steps are established by utilizing the following scheme:

$$j = \arg \max_i (x_{k+1}^j \mid x_k^i, V_k), \forall j$$

In order to reduce processing requirements in an example, the quadratic complexity of this scheme, as it evaluates the density function for each pair (i, j), is reduced by only performing this processing for micro-objects that are located within a certain radius centered around micro-object j. In an example, a determined radius is this radius that is determined by evaluating the maximum distance a micro-object can move in the interval of time between images, given the maximum potential energy that can be created under actuation. The above described limiting of the calculation of the probability density function for the location of each micro-object is an example of determining the respective calculated motion for each respective micro-object during the time duration by at least determining a respective probability density function for the respective location of each respective micro-object at the time of capture of the electric potential profile during the time duration, wherein determining the respective probability density function for each respective micro-object limits calculation of the respective probability density function to within a determined radius of a location of the respective micro-object in the first captured image.

Based on the above described processing, an example determines, for a first image in the time sequence of images based on training the machine learning based image processing model, a respective first location and respective first orientation of each respective micro-object in the plurality of micro-objects on the backplane; estimates, based on forces applied by the micro-assembler station between capture of the first image and capture of the second image, a calculated movement for a tracked micro-object captured in the first image in the time sequence of images during the time difference, wherein the tracked micro-object has an initial location; determines, for a second image in the time sequence of images where the second image is captured at a time difference after the first image, a respective second location and respective second orientation of the each respective micro-object on the backplane; and infers a likely image of the tracked micro-object in the second image based on the likely image having a respective second location and a respective second orientation in the second image that corresponds to a combination of the respective first location and the respective first orientation of the first micro-object in the first image and the calculated movement for the first micro-object. Based on this processing, the process further indicates, based on identifying the likely image of the tracked micro-object in the second image, that the tracked micro-object in the first image corresponds to the likely image of the tracked micro-object in the second image.

Figure 9:
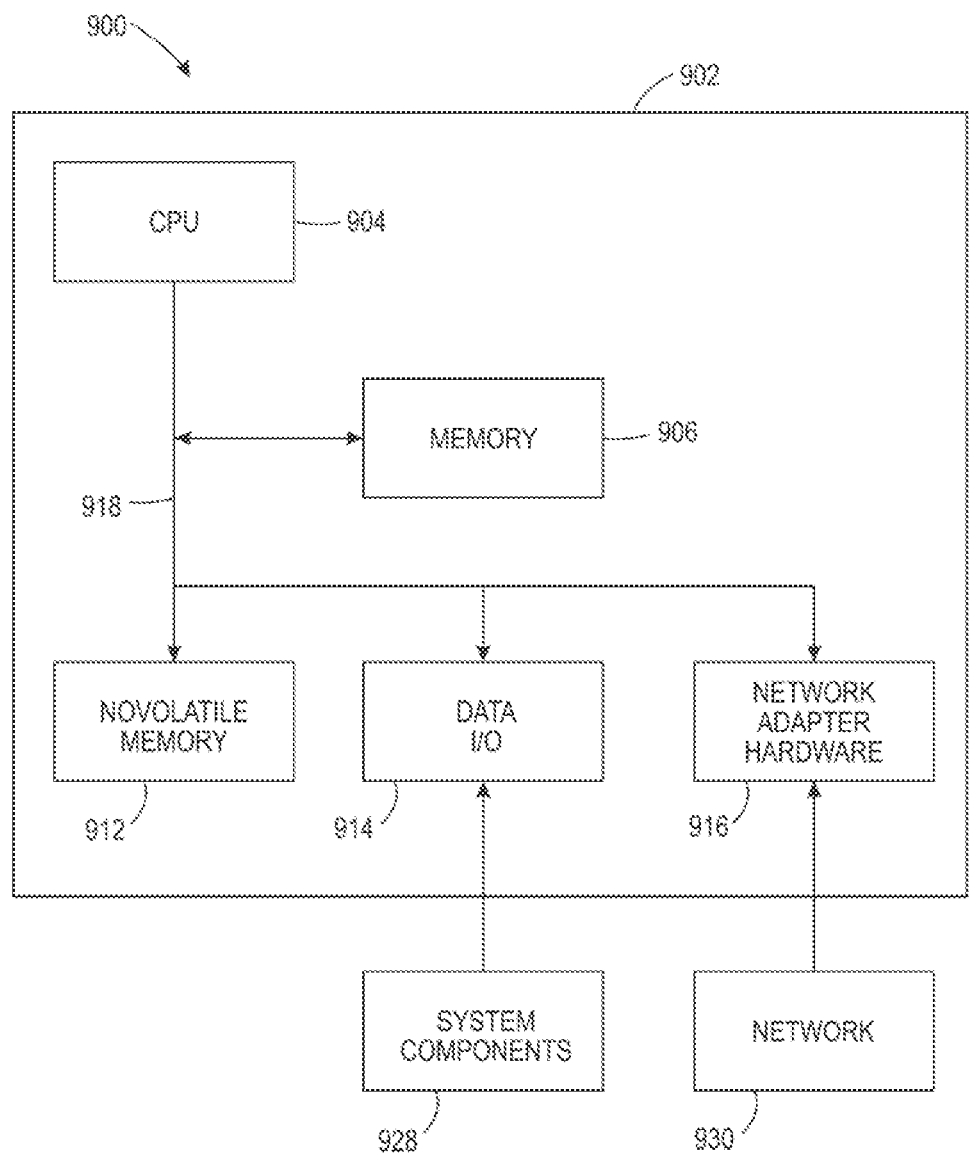
FIG. 9 illustrates a block diagram illustrating a processor, according to an example.

FIG. 9 illustrates a block diagram illustrating a processor 900 according to an example. The processor 900 is an example of a processing subsystem that is able to perform any of the above-described processing operations, control operations, other operations, or combinations of these.

The processor 900 in this example includes a CPU 904 that is communicatively connected to a main memory 906 (e.g., volatile memory), a non-volatile memory 912 to support processing operations. The CPU is further communicatively coupled to a network adapter hardware 916 to support input and output communications with external computing systems such as through the illustrated network 930.

The processor 900 further includes a data input/output (I/O) processor 914 that is able to be adapted to communicate with any type of equipment, such as the illustrated system components 928. The data input/output (I/O) processor in various examples is able to be configured to support any type of data communications connections including present day analog and/or digital techniques or via a future communications mechanism. A system bus 918 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general-purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above-described methods and realize the above-described systems.

What is claimed is:

1. An apparatus for monitoring movement of micro-objects on a backplane, the apparatus comprising:
   an image receiver configured to, when operating, receive a time sequence of captured images of a micro-assembler backplane being processed within a micro-assembler station, wherein the time sequence of images depicts a progression of a plurality of micro-objects moving across the micro-assembler backplane under control of the micro-assembler station;
   an image processor configured to, when operating:
      determine, based on processing of a first captured image in the time sequence of captured images by a machine learning based image processing model, a respective first location and a respective first orientation of each respective micro-object in the plurality of micro-objects on the micro-assembler backplane captured in the first captured image; and
      determine, for a second captured image in the time sequence of images, a respective second location and respective second orientation of each respective micro-object on the micro-assembler backplane;
   a movement processor configured to, when operating:
      estimate, based on estimates of forces applied during a time duration between a time of capture of the first captured image and a time of capture of a second captured image in the time sequence of captured images, a calculated movement during the time duration for a tracked micro-object captured with a respective first location and a respective first orientation in the first captured image in the time sequence of images; and
      infer a likely image of the tracked micro-object in the second captured image based on the likely image having a respective second location and a respective second orientation in the second captured image that corresponds to a combination of the calculated movement for the tracked micro-object applied to the respective first location and the respective first orientation of the tracked micro-object in the first captured image; and
   an indicator output configured to, when operating, indicate, based on an inference of the likely image of the tracked micro-object in the second captured image, that the tracked micro-object in the first captured image corresponds to the likely image of the tracked micro-object in the second captured image.

2. The apparatus of claim 1, wherein the movement processor estimates the calculated movement of the tracked micro-object during the time duration by at least:
   determining a respective potential of each respective micro-object in the plurality of micro-objects during the time duration; and
   determining a respective calculated motion for each respective micro-object during the time duration wherein the respective calculated motion is based on the respective potential of each respective micro-object during the time duration,
   wherein the calculated movement of the tracked micro-object during the time duration is based on the respective calculated motion for each respective micro-object.

3. The apparatus of claim 2, wherein the micro-assembler backplane comprises a plurality of electrodes distributed across its surface, and wherein the movement processor determines the respective potential of each respective micro-object in the plurality of micro-objects by at least:
   determining an electric potential profile across the micro-assembler backplane during the time duration based upon selective activation of a subset of electrodes in the plurality of electrodes during the time duration.

4. The apparatus of claim 3, wherein the movement processor is further configured to, when operating:
   receive indications of the selective activation of the subset of electrodes during the time duration; and
   calculate the electric potential profile based on the indications of the selective activation of the subset of electrodes during the time duration.

5. The apparatus of claim 4, wherein the movement processor is configured to, when operating, determine the respective calculated motion for each respective micro-object during the time duration by at least:
   determining a respective probability density function for the respective second location of each respective micro-object at the time of capture of the electric potential profile during the time duration, wherein determining the respective probability density function for each respective micro-object limits calculation of the respective probability density function to within a determined radius of a location of the respective micro-object in the first captured image.

6. The apparatus of claim 1, further comprising a training data set generator configured to, when operating:
   generate a machine learning process training data set, wherein generating the machine learning process training data set comprises:
      providing a set of object images of micro-objects, where each respective object image in the set of object images comprises a respective view of a micro-object having a respective orientation that is associated with the respective view and is different from each respective orientation of micro-objects in other object images within the set of object images;
      generating a synthesized training image corresponding to a micro-assembler backplane on which micro-objects are placed, each synthesized training image comprising:
         a selected plurality of object images selected from within the set of object images of micro-objects, wherein each respective object image in the selected plurality of object images is located at a respective location in the synthesized training image; and
         a composite set of label data indicating for each respective object image in the selected plurality of object images:
            the respective location of the respective object image in the synthesized training image; and
            the respective orientation of the micro-object within the respective object image; and
   a machine learning model training processor configured to, when operating, train the machine learning based image processing model based on a generated training data set.

7. The apparatus of claim 6, wherein the training data set generator is configured to generate the synthesized training image by at least generating a plurality of synthesized training images, wherein each respective synthesized training image in the plurality of synthesized training images differs from other respective synthesized training images in the plurality of synthesized training images by having at least one respective object image with at least one of: a different location within the synthesized training image; or with a different orientation.

8. The apparatus of claim 6, wherein the training data set generator is configured to generate the synthesized training image by at least modifying the synthesized training image to include a background pattern, where the background pattern comprises an image corresponding to a surface of a micro-assembler backplane on which micro-objects are placed for movement into defined locations.

9. The apparatus of claim 6, wherein the training data set generator is configured to provide the set of object images by at least:
receiving a first object image of a micro-object; and
generating at least some object images in the set of object images by at least manipulating the first object image to generate a respective object image that presents the micro-object in its respective view with a selected orientation.

10. The apparatus of claim 6, the training data set generator is configured to provide the set of object images by at least:
generating at least some object images in the set of object images by at least capturing a plurality of object images of a micro-object where each respective object image in the plurality of object images presents the micro-object with the respective orientation of the respective view.

11. The apparatus of claim 10, wherein the set of object images comprises a first number of object images, where the respective view in the object images in the first number of object images have respective orientations that differ from each other by multiple of an offset angle.

12. A method of controlling placement of micro-objects on a backplane, the method comprising:
receiving a time sequence of captured images of a micro-assembler backplane being processed within a micro-assembler station, wherein the time sequence of images depicts a progression of a plurality of micro-objects moving across the micro-assembler backplane under control of the micro-assembler station;
determining, based on processing of a first captured image in the time sequence of captured images by a machine learning based image processing model, a respective first location and a respective first orientation of each respective micro-object in the plurality of micro-objects on the micro-assembler backplane captured in the first captured image;
estimating, based on estimates of forces applied during a time duration between a time of capture of the first captured image and a time of capture of a second captured image in the time sequence of captured images, a calculated movement during the time duration for a tracked micro-object captured with a first location in the first captured image in the time sequence of images;
determining, for the second captured image in the time sequence of images, a respective second location and respective second orientation of each respective micro-object on the micro-assembler backplane;
inferring a likely image of the tracked micro-object in the second captured image based on the likely image having a respective second location and a respective second orientation in the second captured image that corresponds to a combination of the calculated movement for the tracked micro-object applied to the respective first location and the respective first orientation of the tracked micro-object in the first captured image; and
indicating, based on inferring the likely image of the tracked micro-object in the second captured image, that the tracked micro-object in the first captured image corresponds to the likely image of the tracked micro-object in the second captured image.

13. The method of claim 12, wherein estimating the calculated movement of the tracked micro-object during the time duration comprises:
determining a respective potential of each respective micro-object in the plurality of micro-objects during the time duration; and
determining a respective calculated motion for each respective micro-object during the time duration wherein the respective calculated motion is based on the respective potential of each respective micro-object during the time duration,
wherein the calculated movement of the tracked micro-object during the time duration is based on the respective calculated motion for each respective micro-object.

14. The method of claim 13, wherein the micro-assembler backplane comprises a plurality of electrodes distributed across its surface, and wherein determining the respective potential of each respective micro-object in the plurality of micro-objects comprises:
determining an electric potential profile across the micro-assembler backplane during the time duration based upon selective activation of a subset of electrodes in the plurality of electrodes during the time duration.

15. The method of claim 14, further comprising:
receiving indications of the selective activation of the subset of electrodes during the time duration; and
calculating the electric potential profile based on the indications of the selective activation of the subset of electrodes during the time duration.

16. The method of claim 15, wherein determining the respective calculated motion for each respective micro-object during the time duration comprises:
determining a respective probability density function for the respective location of each respective micro-object at the time of capture of the electric potential profile during the time duration, wherein determining the respective probability density function for each respective micro-object limits calculation of the respective probability density function to within a determined radius of a location of the respective micro-object in the first captured image.

17. The method of claim 12, further comprising:
generating a machine learning process training data set, wherein generating the machine learning process training data set comprises:
providing a set of object images of micro-objects, where each respective object image in the set of object images comprises a respective view of a micro-object having a respective orientation that is associated with the respective view and is different from each respective orientation of micro-objects in other object images within the set of object images;
generating a synthesized training image corresponding to a micro-assembler backplane on which micro-objects are placed, each synthesized training image comprising:
a selected plurality of object images selected from within the set of object images of micro-objects, wherein each respective object image in the selected plurality of object images is located at a respective location in the synthesized training image; and a composite set of label data indicating for each respective object image in the selected plurality of object images:
   the respective location of the respective object image in the synthesized training image; and
   the respective orientation of the micro-object within the respective object image; and training the machine learning based image processing model based on a generated training data set.

18. The method of claim 17, wherein generating the synthesized training image further comprises generating a plurality of synthesized training images, wherein each respective synthesized training image in the plurality of synthesized training images differs from other respective synthesized training images in the plurality of synthesized training images by having at least one respective object image with at least one of: a different location within the synthesized training image; with a different orientation, or both a different location and a different orientation.

19. The method of claim 17, wherein generating the synthesized training image further comprises modifying the synthesized training image to include a background pattern, where the background pattern comprises an image corresponding to a surface of a micro-assembler backplane on which micro-objects are placed for movement into defined locations.

20. The method of claim 17, wherein providing the set of object images comprises:
   receiving a first object image of a micro-object; and
   generating at least some object images in the set of object images by at least manipulating the first object image to generate a respective object image that presents the micro-object in its respective view with a selected orientation.

21. The method of claim 17, wherein providing the set of object images comprises:
   generating at least some object images in the set of object images by at least capturing a plurality of object images of a micro-object where each respective object image in the plurality of object images presents the micro-object with the respective orientation of the respective view.

22. The method of claim 21, wherein the set of object images comprises a first number of object images, where the respective view in the object images in the first number of object images have respective orientations that differ from each other by multiple of an offset angle.

* * * * *